United States Patent
Nickolaou et al.

(10) Patent No.: US 8,600,606 B2
(45) Date of Patent: Dec. 3, 2013

(54) VEHICLE SAFETY SYSTEMS AND METHODS

(75) Inventors: James N. Nickolaou, Clarkston, MI (US); Paul R. Williams, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 395 days.

(21) Appl. No.: 12/704,225

(22) Filed: Feb. 11, 2010

(65) Prior Publication Data

US 2011/0196568 A1  Aug. 11, 2011

(51) Int. Cl.
*G01M 17/00* (2006.01)

(52) U.S. Cl.
USPC ............... 701/29.1; 356/5.01; 342/70; 367/87

(58) Field of Classification Search
USPC .......... 701/29, 9; 340/435; 356/5.01; 342/70; 367/87
See application file for complete search history.

(56) References Cited

U.S. PATENT DOCUMENTS

| | | | | |
|---|---|---|---|---|
| 6,204,753 B1 * | 3/2001 | Schenk et al. | ................ | 340/435 |
| 7,283,907 B2 * | 10/2007 | Fujiwara et al. | ............... | 701/301 |
| 7,588,116 B2 * | 9/2009 | Kamiya | ........................ | 180/274 |
| 7,750,841 B2 * | 7/2010 | Oswald et al. | ................ | 342/147 |
| 8,042,959 B2 * | 10/2011 | Maxwell et al. | .............. | 359/841 |
| 2004/0017288 A1 * | 1/2004 | Rao et al. | ...................... | 340/435 |
| 2005/0280518 A1 * | 12/2005 | Bartels et al. | ................. | 340/435 |
| 2006/0245963 A1 * | 11/2006 | Mori et al. | ..................... | 417/470 |
| 2007/0188312 A1 * | 8/2007 | Bihler et al. | ................... | 340/435 |
| 2008/0030045 A1 * | 2/2008 | Lai et al. | ..................... | 296/146.1 |
| 2008/0204322 A1 * | 8/2008 | Oswald et al. | ................ | 342/465 |
| 2008/0211644 A1 * | 9/2008 | Buckley et al. | ............... | 340/435 |
| 2009/0115593 A1 * | 5/2009 | Avallone et al. | .............. | 340/468 |
| 2011/0057782 A1 * | 3/2011 | Chundrlik et al. | ............ | 340/436 |
| 2011/0241857 A1 * | 10/2011 | Brandenburger et al. | ..... | 340/435 |
| 2011/0295463 A1 * | 12/2011 | Daly et al. | ...................... | 701/36 |

FOREIGN PATENT DOCUMENTS

| | | |
|---|---|---|
| DE | 10321904 A1 | 8/2004 |
| DE | 102008036009 A1 | 10/2009 |

OTHER PUBLICATIONS

German Office Action, dated Nov. 10, 2011, for German Patent Application No. 10 2011 010 242.6.

* cited by examiner

*Primary Examiner* — Thomas Black
*Assistant Examiner* — Shardul Patel
(74) *Attorney, Agent, or Firm* — Ingrassia Fisher & Lorenz, P.C.

(57) ABSTRACT

Safety systems and methods are provided for use in a vehicle with a closure that defines a pivoting range when open. The safety system includes a sensor configured to collect data associated with an object in a target zone at least partially surrounding the vehicle; and a processor coupled to the sensors and configured to selectively operate in a first mode and a second mode based on a vehicle characteristic. The processor is configured to, in the first mode, detect the object and generate a first warning based on the object; and in the second mode, detect the object and determine a collision threat between the object and the pivoting range of the closure, and generate a second warning based on the collision threat.

20 Claims, 3 Drawing Sheets

VEHICLE SAFETY SYSTEMS AND METHODS

TECHNICAL FIELD

The present invention generally relates to vehicle safety systems, and more particularly relates to vehicle safety systems that prevent collisions between external objects and the doors or other closures of the vehicle.

BACKGROUND OF THE INVENTION

Increasingly, vehicles are being equipped with sensors that generate data describing the surrounding environment and terrain. For example, some vehicles include sensor systems that provide images of the terrain and/or other objects in the vicinity of the vehicle. Further, other sensor systems, such as radar, have been used to detect the presence and position of objects in the vehicle's path. The data generated by these sensor systems may be utilized by various vehicular systems to provide vehicle control, collision avoidance, adaptive cruise control, collision mitigation, speed control systems, lane departure systems, parking assistance systems and other active safety features. As such, these active sensor systems are conventionally used to assist the driver while driving to intervene in the control of the vehicle, for example, by braking or providing braking assistance.

In contrast to the dynamic responses of conventional systems, another type of accident risk involves collisions with objects when the vehicle is stationary. For example, a cyclist riding past a car may be subject to injury if an inattentive driver opens the door in the cyclist's path. However, conventional active safety sensor systems do not contemplate non-moving or slow moving safety situations.

Accordingly, it is desirable to provide a vehicle safety system that prevents collisions, particularly door or other closure collisions when the vehicle is stationary. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In accordance with an exemplary embodiment, a safety system is provided for use in a vehicle with a closure that defines a pivoting range when open. The safety system includes a sensor configured to collect data associated with an object in a target zone at least partially surrounding the vehicle; and a processor coupled to the sensors and configured to selectively operate in a first mode and a second mode based on a vehicle characteristic. The processor is configured to, in the first mode, detect the object and generate a first warning based on the object; and in the second mode, detect the object, determine a collision threat between the object and the pivoting range of the closure, and generate a second warning based on the collision threat.

In accordance with another exemplary embodiment, a method is provided for detecting an object in a target zone of a vehicle having a closure that defines a pivoting range when open. The method includes evaluating a vehicle operating characteristic; selectively operating in a first mode and a second mode based on the vehicle operating characteristic; determining, in the first mode, a first position of the object relative to the vehicle; evaluating, in the first mode, a first collision threat based on the first position; generating, in the first mode, a first warning based on the first collision threat; determining, in the second mode, a second position of the object relative to the pivoting range of the closure; evaluating, in the second mode, a second collision threat based on the second position; and generating, in the second mode, a second warning based on the second collision threat.

DESCRIPTION OF THE DRAWINGS

The present invention will hereinafter be described in conjunction with the following drawing figures, wherein like numerals denote like elements, and wherein.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Broadly, exemplary embodiments discussed herein relate to vehicle safety systems and methods. The system may be an integrated safety system that selectively operates in two modes based on a vehicle operating characteristic, such as vehicle speed. In a first mode, such as when the vehicle is in motion, the safety system monitors a target area for objects and provides warnings and dynamic responses based on the object. In a second mode, such as when the vehicle is stationary, the safety system monitors a target area for objects and provides warning and other responses based on the object. For example, in the second mode, the vehicle safety system may prohibit or inhibit a door or other closure from opening to prevent a collision with the object.

Figure 1:
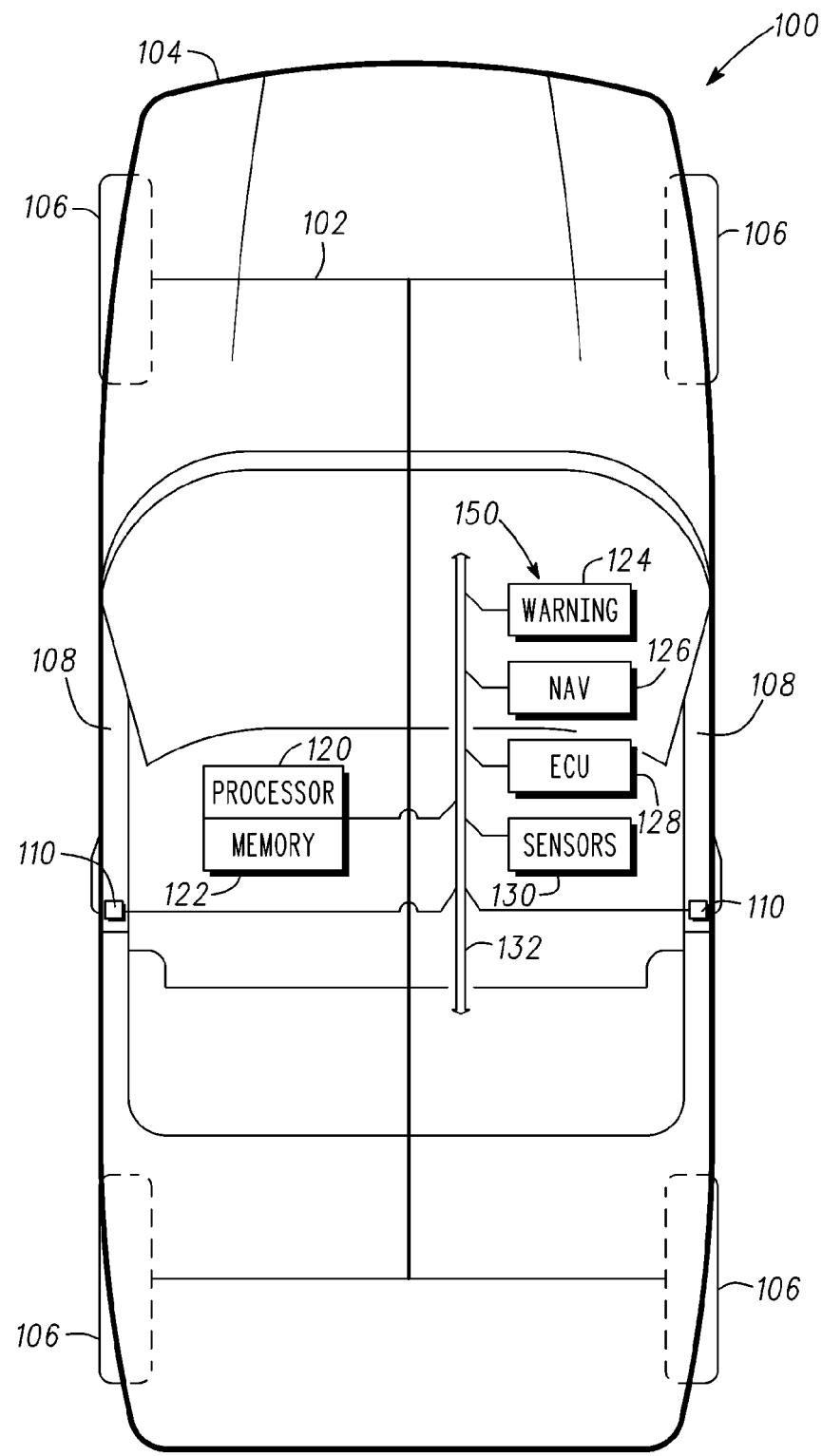
FIG. 1 is a block diagram of an exemplary vehicle with a safety system according to an exemplary embodiment.

FIG. 1 is a block diagram of an exemplary vehicle 100 according to one embodiment. The vehicle 100 includes a chassis 102, a body 104, at least one wheel 106, and at least one door 108. The body 104 is arranged on the chassis 102 and substantially encloses the other components of the vehicle 100. The body 104 and the chassis 102 may jointly form a frame. The wheels 106 are each rotationally coupled to the chassis 102 near a respective corner of the body 104.

In the illustrated embodiment, the vehicle 100 includes four wheels 106 and two doors 108. As discussed in greater detail below, the doors 108 may each include a door actuation device 110 that opens and closes the door 108. The door actuation device 110 may additionally function to stop or slow the opening of the door 108. Although not shown, the vehicle 100 may include other closures, such as an engine hood, a hatch, or a trunk door, and associated closure actuation devices to prevent or inhibit opening of these closures. Aspects of the door 108 and door actuation device 110 are described in greater detail below.

The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), three-wheel drive (3WD), or all-wheel drive (AWD). The vehicle 100 may also incorporate any one of, or combination of, a number of different types of engines (or actuators), such as, for example, a gasoline or diesel fueled combustion engine, a flex fuel vehicle (FFV) engine (i.e., using a mixture of gasoline and alcohol), a gaseous compound (e.g., hydrogen and/or natural gas) fueled engine, a fuel cell, a combustion/electric motor hybrid engine, or an electric motor.

The vehicle 100 may further include an active safety system 150, which includes processor 120, memory 122, a warning device 124, a navigation device 126, one or more electronic control units (ECUs) 128, and an active sensor group 130. As depicted, warning device 124, navigation device 126, ECUs 128, and sensor group 130 are each coupled to the processor 120 via a data communication link 132. In one embodiment, the data communication link 132 includes one or more onboard data communication buses that transmit data, status and other information or signals between various components of vehicle 100. Onboard data communications links 132 may include any suitable physical or wireless mechanisms of connecting computer systems and components.

The processor 120 may include any type of processor or multiple processors, single integrated circuits such as a microprocessor, or any suitable number of integrated circuit devices and/or circuit boards working in cooperation to accomplish the functions of a processing unit. During operation, processor 120 executes one or more instructions stored within memory 122.

Memory 122 can be any type of suitable memory, including various types of dynamic random access memory (DRAM) such as SDRAM, various types of static RAM (SRAM), and various types of non-volatile memory (PROM, EPROM, and flash). As noted above, memory 122 stores instructions for executing instructions associated with the systems and methods described herein.

The warning device 124 may be any type of device that generates a message to the user of the vehicle 100. For example, the warning device 124 may be a display device that renders various images (textual, graphic, or iconic) within a display area in response to commands received from processor 120. Such a display device may be realized using a liquid crystal display (LCD), a thin film transistor (TFT) display, a plasma display, a light emitting diode (LED) display, or the like. In further embodiments, the warning device 124 may be an acoustical device that outputs an audible warning signal to the user, or the warning device 124 may be a haptic device that vibrates to provide a signal to the user. In further embodiments, the warning device 124 may be omitted and/or incorporated into the door actuation device 110, for example, to prevent or inhibit the user from opening the door 108.

The navigation device 126 generates data associated with the current position of vehicle 100. In one embodiment, navigation device 126 includes a global positioning system (GPS) and/or one or more inertial measurement units (IMUs) for determining the current coordinates of vehicle 100 based on received GPS signals and/or dead reckoning techniques.

The ECU 128 includes one or more automotive control units for controlling the various systems of vehicle 100, such as a stability control unit, a steering control unit, and a braking control unit. As such, the ECU 128 may include one or more controllers, actuators, sensors, and/or other components that control the operation, handling, and other characteristics of vehicle 100.

The sensor group 130 detects various attributes of the environment surrounding the vehicle 100. In particular, the sensor group 130 may include one or more sensors working together to generate data describing the terrain and other objects within at least a portion of the area surrounding the vehicle 100 (hereinafter, the "target area"). The arrangement of the sensor group 130 and the resulting target area will be discussed in greater detail below with reference to FIG. 2.

The sensor group 130 includes a plurality of similar or dissimilar active terrain sensing devices, such as one or more Light Detection and Ranging (LIDAR) devices, cameras, radar devices, ultrasonic devices, and 3D time-of-flight (TOF) lasers. It will be appreciated that alternative embodiments may include other types of sensors as well. As an example, cameras generate images of the target area, including images of a road, other vehicles, and other objects within the target area, and may include charged-coupled devices (CCD) or complementary metal oxide semi-conductor (CMOS) video image sensors. In one embodiment, stereo cameras may generate images depicting the height/elevation and curvature of objects in the target area. Radar device utilize radio waves to sense the presence and position of objects within the target area. As another example, LIDAR devices transmit light (e.g., ultraviolet, visible, and infrared) at the target area and some of this light is reflected/scattered back by the objects in the target area. This reflected light is received and analyzed to determine various attributes of the objects in of the target area. For example, LIDAR devices may determine the proximity of the objects within the target area based on the time required for the transmitted light to be reflected back.

Figure 2:
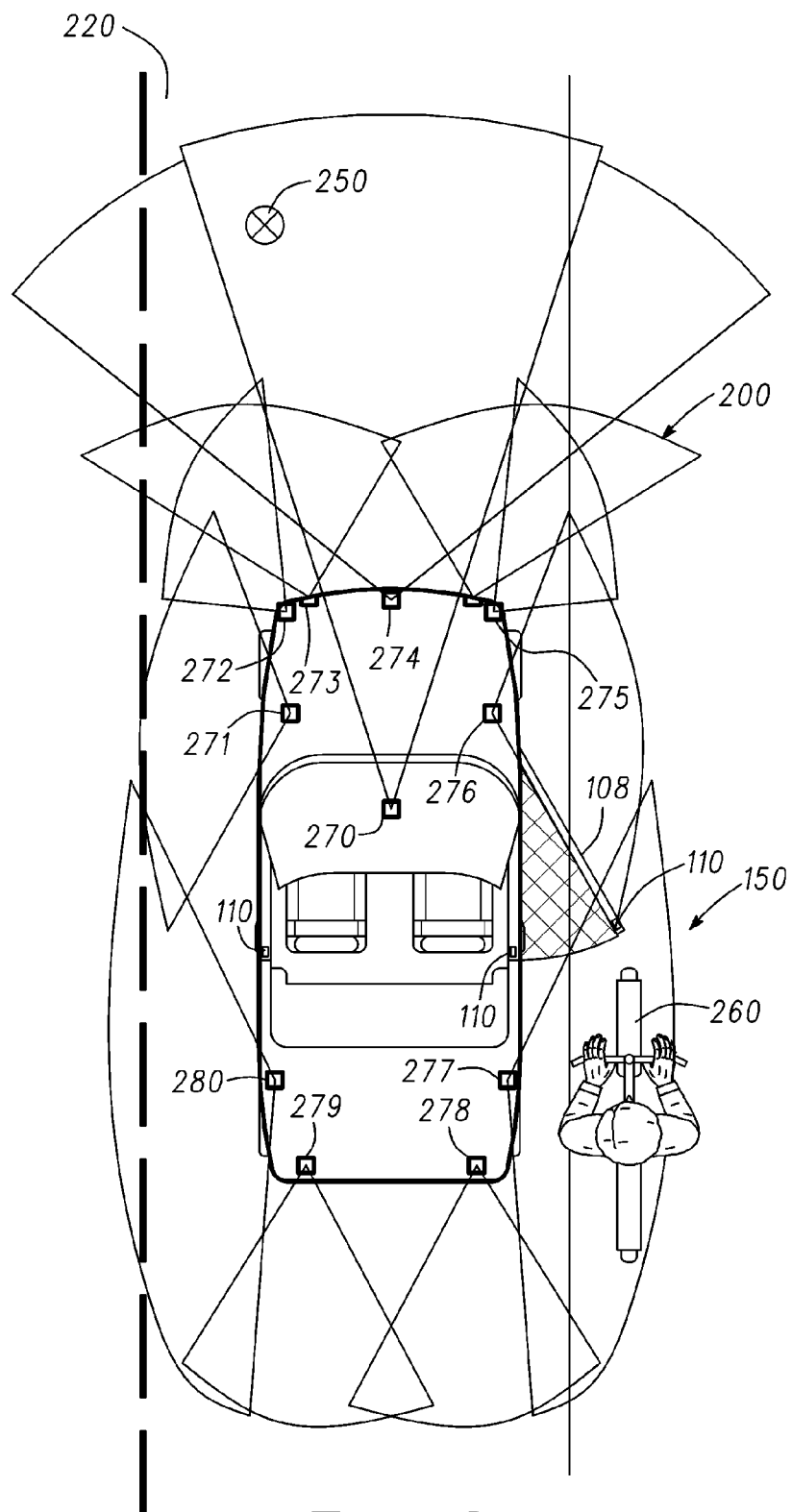
FIG. 2 depicts a target area and sensor arrangement of the safety system of FIG. 1 in accordance with an exemplary embodiment.

FIG. 2 depicts aspects the safety system 150 of the vehicle 100 of FIG. 1 in accordance with an exemplary embodiment. Accordingly, reference is additionally made to FIG. 1 in the discussion below.

FIG. 2 illustrates one exemplary arrangement of the sensor group 130 that includes sensors 270-280. However, the sensors 270-280 may be arranged in any suitable configuration, including inside or outside the body of the vehicle 100. As one example, the sensor group 130 includes a sensor 270 on the front dashboard of the vehicle, four sensors 272-275 in the front bumper of the vehicle 100, two sensors 271, 276 in the front wheel wells, and four sensors 277-280 in the rear bumper. In general, the sensor group 130 can include a mix of sensor types, and in this exemplary embodiment, the sensor group 130 includes both long range sensors (e.g., sensors 270, 274) and short range sensors (e.g., sensors 271-273, 275, 280).

As noted above, the sensors 270-280 cooperate to define a target area 200 surrounding the vehicle 100 such that the sensors 270-280 detect and monitor objects or obstructions (e.g., objects 250, 260) within the target area 200. In some embodiments, the road 220 may be considered an object that is evaluated by the safety system 150. As shown, each sensor 130 has a range that forms a portion of the target area 200. The portions overlap or otherwise cooperate to form a full target area 200 surrounding the vehicle. Although FIG. 2 depicts the target area 200 in plan view, i.e., extending in a horizontal or lateral direction relative to the ground, the target area 200 also extends in a vertical or elevation direction relative to the ground to, in effect, form a 3D envelope or cocoon around the vehicle 100. In FIG. 2, the target area 200 is not necessarily drawn to scale and may vary based on driving conditions and user settings. In one embodiment, the target area 200 may be extended by the user if the vehicle 100 is carrying, for example, a bike rack or luggage carrier.

As discussed in further detail below, the objects 250, 260 may be stationary or moving, and may be within the path of the vehicle 100, like object 250, or within the target area 200 but not within the path of the vehicle 100, like object 260. As shown in FIG. 2, the object 250 is a tree, and object 260 is a cyclist. In general, however, the objects 250, 260 can be any object that poses a collision risk with the vehicle 100. For example, the object can be other vehicles, pedestrians, animals, walls, poles, parking meters, uneven ground clearances, and the like.

The safety system 150 may selectively function in one of two modes depending on the speed or other operating characteristics of the vehicle 100. In a first mode, the vehicle 100 is generally traveling above a threshold speed, and the safety system 150 functions as an active driving system. In a second mode, the vehicle 100 is stopped or traveling below the threshold speed, and the safety system 150 functions as an active door collision prevention system. The threshold speed can be any suitable speed at which the door 108 of the vehicle 100 may be opened. For example, the threshold speed may be 0 mph. However, the threshold speed may also be relatively low rates of speed such as 5 or 10 mps. In a further embodiment, the modes may be selected based on another vehicle characteristic. For example, the second mode may be triggered by a driver or passenger attempting to open the door 108, regardless of vehicle speed. In this situation, the door actuation device 110 may send a signal to the processor 120 to initiate the second mode. A description of the dual modes of the safety system 150 will now be discussed in greater detail with continued reference to FIGS. 1 and 2.

Initially, the processor 120 receives information about the speed or other operating characteristic of the vehicle 100. For example, the speed may be provided by the ECU 128, wheel speed sensors, transmission output, or other mechanisms. If the speed is above a threshold speed, the processor 120 operates the safety system 150 in the first mode.

In the first mode, the safety system 150 detects and monitors objects within the target zone 200. Particularly, while driving, the sensors 270-280 of the safety system 150 monitor the target area 200. For example, the sensors 270-280 may be LIDAR device that generate data describing the topography and reflective properties of the target area. Such LIDAR data may include a plurality of scans extending across the target area 200. Each scan-line corresponds to a different scan angle of LIDAR and describes the topography and reflectance intensity on surfaces in the target area 200. Attributes of the objects within the target area 200 may be discerned by this reflectance intensity of the scan-lines. In addition to LIDAR data, other sensor data, such as camera data and 3D laser data may be used to increase the precision and/or speed of the safety system 150. In this manner, sensor data from sensors 270-280 represents a snapshot of the target area 200.

Based on the data collected by the sensors 270-280 in the first mode, the safety system 150 may provide warnings or initiate dynamic responses that relate to control of the moving vehicle 100. For example, the safety system 150 may function as a lane departure system in which the processor 120 identifies substantially smooth or flat segments within the target area 200 that correspond to the position of the road 220, and the processor 120 then analyzes these segments to detect the shape and curvature of the road 220. The processor 120 may then use operational information about the vehicle 100, for example, from the ECU 128 or other sensors, to compare the present and impending path of the vehicle 100 to the road 220. If the path of the vehicle 100 deviates from the road 220, or is in danger of deviating from the road 220, the processor 120 may initiate a warning signal from the warning device 124. In another embodiment, the processor 120 may automatically initiate a dynamic response, for example, by generating a signal to the ECU 128 to correct the steering or slow the vehicle down. The dynamic response of the safety system 150 may be based on vehicle speed and imminence of danger.

Other considerations may include operational aspects of the vehicle 100, such as steering position, yaw rate, lateral acceleration, and longitudinal acceleration. In this context, various operational values may be compared with predefined set point values and the sensor data of the safety system 150 to initiate dynamic responses, including systems such an antilock brake system and/or electronic stability program which have the function of supporting the driver of the motor vehicle in critical driving situations in order to avoid an accident In another embodiment, the safety system 150 in the first mode may function as a collision avoidance system in which the processor 120 identifies obstacles, such as object 250 in the target zone 200. The processor 120 may then use operational information about the vehicle 100, for example, from the ECU 128 or other sensors, to compare the present and impending path of the vehicle 100 to the object 250. If the path of the vehicle 100 intersects with the object 250, the processor 120 may initiate a warning signal from the warning device 124. In another embodiment, the processor 120 may initiate a dynamic response by automatically generating a signal to the ECU 128 to steer the vehicle 100 away from the object 250 or slow the vehicle 100 down to prevent collision with the object 250. In further embodiments, in the first mode, the safety system 150 may additionally function as adaptive cruise control, parking assistance, blind spot detection, speed control, or other vehicle control safety system that adjusts the operation and control of the vehicle 100 as a dynamic response.

As noted above, if the speed of the vehicle 100 is at or below a threshold speed, the processor 120 operates the safety system 150 in the second mode to function as an active closure collision prevention system.

As shown, the vehicle 100 has two doors 108 on opposing sides. In FIG. 2, one of the doors 108 is in an open position. The door 108 has a pivoting range 230, indicated by cross-hatching, extending at a generally known distance from the vehicle 100. The door 108 is illustrated as a side door; however, any vehicle closure or door is contemplated, including swing doors or trunk lids, engine hoods, sliding side doors, lift gates, tailgates, winged doors or the like. The size, weight, geometry, and maximum opening angle of the door 108, and thus the pivoting range 230, will vary from vehicle to vehicle.

In the second mode, the sensors 270-280 monitor the target area 200 for objects, such as cyclist 260. The sensors 270-280 provide data associated with the cyclist 260 to the processor 120. The processor 120 then determines the proximity of the cyclist 260, which can be based, for example, on a single detection of the cyclist 260. In other embodiments, the evaluation of the cyclist 260 can be based on multiple sensor readings to provide a direction, speed, and/or trajectory of the cyclist 260. These multiple sensor readings may be generated by the same sensor at different times or different sensors as the door 108 and cyclist 260 move relative to one another. In effect, the sensors 270-280 may provide multi-sensor fusion.

The position and trajectory of the cyclist 260 are compared to the pivoting range 230 of the door 108 to determine if collision in imminent. Although the trajectory of the cyclist 260 is illustrated with respect to a single door 108, the processor 120 may consider the trajectory of the cyclist 260 with respect to any of the doors 108 to provide a specific response to a particular door. In one exemplary embodiment, the response of the safety system 150 can be based on a threat assessment, which may include consideration of the type of object, the speed of the object and/or vehicle, and a time-to-collision determination.

If the cyclist 260 is projected to collide with the door 108, the safety system 150 generates a warning on the warning device 124. As noted above, the warning device 124 may be a visible warning, an audible warning, and/or a haptic warning to indicate the collision danger to the driver or passenger. The warning device 124 may also, for example, generate a visible light in a rear view mirror on the vehicle 100.

Depending on the threat assessment, the safety system 150 may also generate a response at the door 108. In some cases, this response may occur only when a driver or passenger attempts to open the door 108 or if such an attempt is imminent based on the presence of the passenger or driver in the seat adjacent to the door 108. For example, the processor 120 may send a signal to the door actuation device 110 to slow or prevent the opening of the door 108 if the pivoting range 230 intersects with the trajectory of the cyclist 260. As such, a collision may be prevented. Accordingly, in one exemplary embodiment, the sensors 270-280 are not located on the associated closure, i.e., none of the sensors 270-280 are located on the door 108 despite the fact that the sensors 270-280 function to prevent collisions between the object 260 and the door 108.

The door actuation device 110 may include a locking mechanism that prevents the door 108 from being opened. In another embodiment, the door actuation device 110 can be a mechanical block that prevents or limits the door 108 from being opened. In a further embodiment, the door actuation device 110 can provide a selectively variable force or resistance that restricts the rotation of the door 108 with respect to the vehicle 100. The resistance can be varied to gradually restrict or slow the movement of the door 108 relative to the cyclist 260, for example, as a function of the proximity, the opening angle, and/or the angular speed of the door 108. In one exemplary embodiment, the door actuation device 110 includes a fluid device or damper that dampens or stops the movement of a piston assembly, thereby restricting rotation of the door 108. Other door actuation devices 110 may include electro-mechanical devices, piezoelectric devices, magnetic and/or materials configured to apply the selectively variable force. In some embodiments, the door actuation device 110 may be configured to yield to an override force such that the user can supply a force that overcomes the variable force of the door actuation device 110, thereby allowing free motion of the door 108. Similar actuation devices may be provided on other closures, including on the trunk, rear gate, engine hood, and the like.

The door actuation device 110 may also function to adjust side mirrors in response to the object 260. For example, if the safety system 150 detects the object 260 in proximity to the closed door 108 and determines that the object 260 will strike the side mirror, the safety system 150 may tuck the mirror into the door 108 to prevent a collision.

The discussion above discusses the safety system 150 in the second mode with reference to a cyclist 260 traveling past a parked vehicle 100. However, the safety system 150 may additionally be used in various scenarios. For example, the detected object may be a stationary object at a position such that the object is already within the pivoting range 230. In this instance, the "trajectory" of the object would also prompt the safety system 150 to issue a warning and/or actuate a response to prevent or inhibit movement of the door 108. As such, as a driver drives the vehicle 100 into a parking lot, the safety system 150 may prevent the door 108 from striking an adjacent car, wall, or post. As another example, the safety system 150 in the second mode may prevent the vehicle 100 from striking a partially raised garage door when entering or exiting a garage or prevent a vehicle hood from hitting an object above the vehicle. The safety system 150 may also be extended to prevent a vehicle top carrier from striking a garage roof or barrier.

Figure 3:
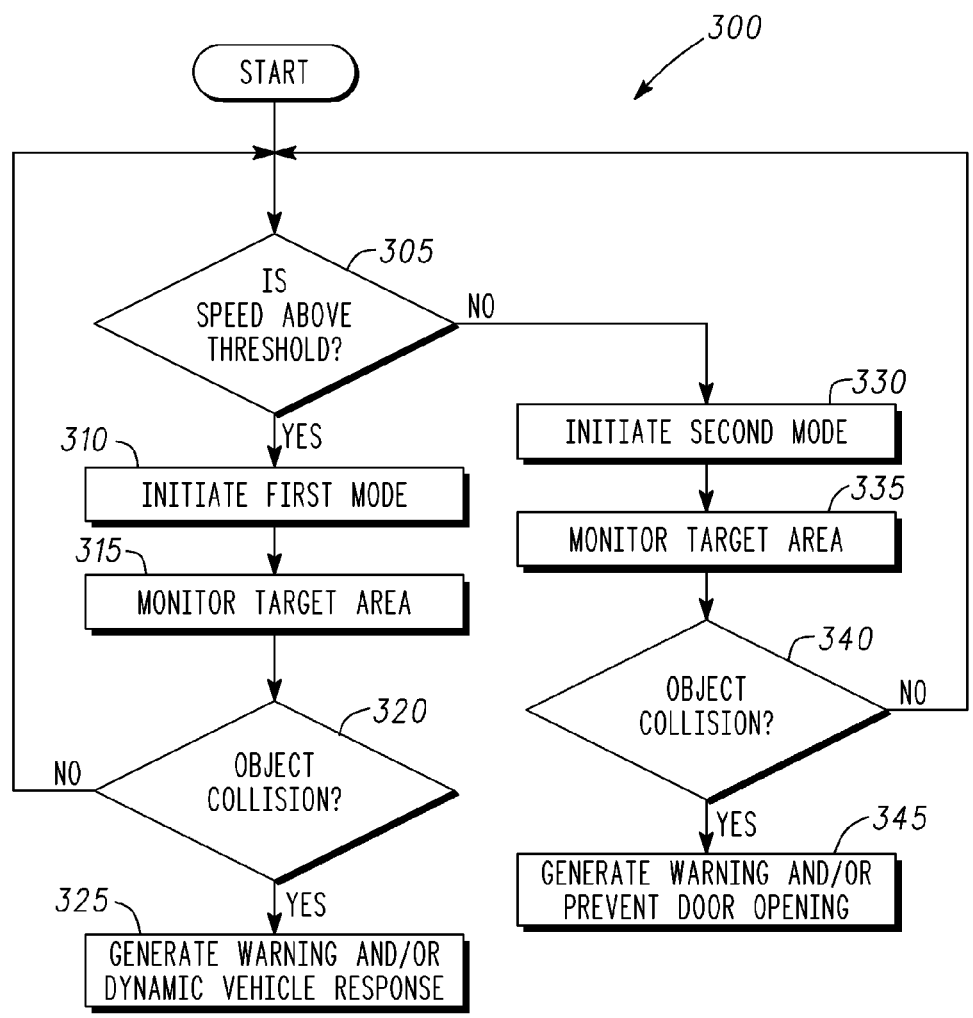
FIG. 3 is a flowchart of an exemplary vehicle safety method in accordance with an exemplary embodiment.

FIG. 3 is a flowchart of an exemplary vehicle safety method 300 in accordance with an exemplary embodiment. Reference is additionally made to FIGS. 1 and 2.

In a first step 305, the safety system 150 evaluates the speed of the vehicle 100. If the vehicle 100 is above a threshold speed, the method 300 progresses to step 310 in which the safety system 150 functions in the first mode. If the vehicle 100 is not above a threshold speed, the method 300 progresses to step 330 in which the safety system 150 functions in the second mode, as discussed in greater detail below.

Referring to step 315, the sensors 270-280 of the safety system 150 monitor the target area 200 for objects. In step 320, the processor 120 evaluates any object within the target area 200 and determines if the object poses a collision threat to the vehicle 100. If the object does not pose a collision threat to the vehicle 100, the method 300 returns to step 305 in which the speed of the vehicle is again determined. If the object does pose a collision threat to the vehicle 100, the processor 120 initiates a warning on the warning device 124. Based on the level of threat, operating conditions, and user settings, the processor 120 may also signal the ECU 128 to generate a dynamic response, thereby slowing or changing the path of the vehicle 100.

Referring again to step 330, if the safety system 150 is in the second mode, the method 300 then progresses to step 335 in which the processor 120 evaluates any object within the target area 200 and determines if the object poses a collision threat to the vehicle 100, particularly the door 108 of the vehicle 100. If the object does not pose a collision threat to the vehicle 100, the method 300 returns to step 305 in which the speed of the vehicle 100 is again determined. If the object does pose a collision threat to the vehicle 100, the processor 120 initiates a warning on the warning device 124. Based on the level of threat, operating conditions, and user settings, the processor 120 may also signal the door actuation device 110 to prevent or inhibit opening of the door 108. The warning and actuation prevents the door 108 from colliding with the vehicle 100.

As such, vehicle safety systems and methods are provided. The systems and method may be integrated safety system and method that selectively provides a dynamic response or a door actuation response based on the operating conditions of the vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A safety system for use in a vehicle, the vehicle having a pivoting closure with a range of movement, the safety system comprising:
   a sensor configured to collect data associated with an object in a target zone at least partially surrounding the vehicle;
   a processor coupled to the sensor and configured to selectively operate in a first mode and a second mode based on a vehicle characteristic; and a door actuation device coupled to the processor and configured to control the range of movement of the pivoting closure, wherein the processor further configured to in the first mode, detect the object and generate a first warning based on a characteristic of the object; and in the second mode, detect the object, determine a collision threat between the object and the pivoting range of the closure, and generate a second warning based on the collision threat, wherein the processor, in the second mode, is configured to signal the door actuation device to inhibit the closure from opening with a resistance that is varied based on the collision threat.

2. The safety system of claim 1, wherein the processor, in the first mode, is configured to initiate a dynamic response of the vehicle based on the object.

3. The safety system of claim 2, wherein the dynamic response includes slowing down the vehicle.

4. The safety system of claim 1, wherein the vehicle characteristic includes vehicle speed, and wherein the processor is configured to operate in the first mode if the vehicle speed is above a threshold value and to operate in the second mode if the vehicle speed is not above the threshold value.

5. The safety system of claim 4, wherein the threshold value is approximately zero.

6. The safety system of claim 1, wherein the sensor includes a three-dimensional time of flight (TOF) laser.

7. The safety system of claim 1, wherein the sensor includes at least one of a radar sensor, an ultrasound sensor, or a LIDAR sensor.

8. The safety system of claim 1, wherein the processor, in the second mode, is configured to prevent the closure from opening based on the collision threat.

9. The safety system of claim 1, wherein the processor, in the second mode, is configured to determine a trajectory of the object, the collision threat including the trajectory of the object relative to the pivoting range of the closure.

10. The safety system of claim 1, wherein the door actuation device is a fluid device with a piston assembly.

11. The safety system of claim 1, wherein the processor is configured to, in the second mode, signal the door actuation device to inhibit the closure from opening based on at least one of proximity of the collision threat, opening angle of the closure, or angular speed of the closure.

12. The safety system of claim 10, wherein the door actuation device is configured to control the range of movement of the pivoting closure by inhibiting the pivoting closure with the resistance that is varied based on the collision threat when the pivoting closure is at least partially open.

13. A method for detecting an object in a target zone of a vehicle, the vehicle having a pivoting closure with a range of movement, the method comprising the steps of:

evaluating a vehicle operating characteristic;

selectively operating in a first mode and a second mode based on the vehicle operating characteristic;

determining, in the first mode, a first position of the object relative to the vehicle;

evaluating, in the first mode, a first collision threat of the vehicle with the object based on the first position;

generating, in the first mode, a first warning based on the first collision threat;

determining, in the second mode, a second position of the object relative to the pivoting range of the closure;

evaluating, in the second mode, a second collision threat of the closure with the object based on the second position;

generating, in the second mode, a second warning based on the second collision threat; and inhibiting, in the second mode, the closure from opening with a resistance that is varied to gradually restrict movement of the closure based on the second collision threat when the closure is at least partially open.

14. The method of claim 13, wherein method further comprises initiating, in the first mode, a dynamic response of the vehicle based on the first collision threat.

15. The method of claim 14, wherein the initiating step includes slowing down the vehicle.

16. The method of claim 13, wherein the step of evaluating the vehicle operating characteristic includes comparing vehicle speed to a threshold value, and wherein the selectively operating step includes operating in the first mode if the vehicle speed is above the threshold value and operating in the second mode if the vehicle speed is not above the threshold value.

17. The method of claim 13, wherein the step of evaluating the vehicle operating characteristic includes determining if the vehicle is in motion, and wherein the selectively operating step includes operating in the first mode if the vehicle is in motion and operating in the second mode if the vehicle is not in motion.

18. The method of claim 13, wherein the step of determining, in the first mode, the first position includes determining the first position with a three-dimensional time of flight (TOF) laser; and wherein the step of determining, in the second mode, the second position includes determining the second position with the three-dimensional time of flight (TOF) laser.

19. The method of claim 13, wherein the step of determining, in the first mode, the first position includes determining the first position with a LIDAR sensor; and wherein the step of determining, in the second mode, the second position includes determining the second position with the LIDAR sensor.

20. The method of claim 13, further comprising the step of preventing, in the second mode, the closure from opening based on the second collision threat.

* * * * *